United States Patent [19]

Glifberg et al.

[11] Patent Number: 4,633,956
[45] Date of Patent: Jan. 6, 1987

[54] ARRANGEMENT IN ROOT-CROP HARVESTING MACHINES

[75] Inventors: Nils B. Glifberg, Staffanstorp; Wilhelm Bengtsson, Glumslöv, both of Sweden

[73] Assignee: Svenska Sockerfabriks AB, Malmo, Sweden

[21] Appl. No.: 652,309

[22] Filed: Sep. 19, 1984

[30] Foreign Application Priority Data

Sep. 20, 1983 [SE] Sweden .............................. 8305053

[51] Int. Cl.⁴ ..................... A01D 17/06; A01D 25/04; A01D 27/04; B65G 13/02
[52] U.S. Cl. ........................................ 171/25; 171/26; 171/120; 171/133; 198/780
[58] Field of Search ............... 171/114, 117, 118, 119, 171/120, 133, 111, 25; 198/780

[56] References Cited

U.S. PATENT DOCUMENTS

| 481,645 | 8/1892 | Wiborg | 171/25 |
| 2,670,846 | 3/1954 | Rienks et al. | 171/133 |
| 2,828,825 | 4/1958 | Johnson | 171/118 |
| 3,128,485 | 4/1964 | Bradshaw et al. | 171/133 |
| 4,212,148 | 7/1980 | Brownlee | 56/328 R |

FOREIGN PATENT DOCUMENTS

| 511963 | 6/1952 | Belgium | 171/133 |
| 1224079 | 9/1966 | Fed. Rep. of Germany | 171/25 |
| 1811671 | 6/1970 | Fed. Rep. of Germany | 171/130 |
| 2047801 | 5/1971 | Fed. Rep. of Germany | 171/133 |
| 2616514 | 2/1977 | Fed. Rep. of Germany | 171/133 |
| 1908106 | 8/1977 | Fed. Rep. of Germany | 171/117 |
| 2839049 | 3/1979 | Fed. Rep. of Germany | 171/120 |
| 917342 | 9/1946 | France | 171/120 |
| 1423988 | 11/1965 | France | 171/120 |
| 2149786 | 3/1973 | France | 171/126 |
| 2363977 | 5/1978 | France | 171/25 |
| 367317 | 6/1958 | Japan | 171/133 |

Primary Examiner—Robert A. Hafer
Assistant Examiner—Terrence L. B. Brown
Attorney, Agent, or Firm—Merchant, Gould, Smith, Edell, Welter & Schmidt

[57] ABSTRACT

A machine for harvesting sugar-beets growing in rows in the soil is provided with a unit for loosening and lifting the sugar-beets, a cleaning unit for cleaning the sugar-beets from soil and stones, and an elevator for transferring the sugar-beets from the cleaning unit to an unloading conveyor positioned at a higher level than said cleaning unit and serving to unload the sugar-beets. The cleaning unit has a number of cleaning rolls having a core on which cleaning pins made of rubber or like material and projecting on either side are mounted, said cleaning pins having a flexural strength such that they do not damage the sides of the root-crops. Furthermore, the cleaning pins are so mounted on the associated cleaning roll that they are equally flexible in all directions. The cleaning unit also has an endless holding-down mat travelling around guide pulleys, the lower part of said holding-down mat exerting a load on the sugar-beets against the cleaning pins. The speed of the holding-down mat can be varied independently of the rotation of the cleaning rolls to adjust the transit time of the sugar-beets in the cleaning unit according to the amount of soil and stones carried along. The object of these steps is to make the cleaning pins, in cooperation with the holding-down mat, clean the sugar-beets in a gentle manner without causing damage.

2 Claims, 3 Drawing Figures

ARRANGEMENT IN ROOT-CROP HARVESTING MACHINES

FIELD OF THE INVENTION

The present invention relates to an arrangement in a machine for harvesting root-crops growing in rows in the soil, especially sugar-beets, said machine comprising a unit for loosening and lifting the root-crops, a cleaning unit for cleaning the root-crops from soil and stones, and an elevator for transferring the root-crops from the cleaning unit to an unloading conveyor positioned at a higher level than the cleaning unit, said cleaning unit having a number of mutually parallel cleaning rolls mounted transversely of the direction of travel of the machine and rotatably driven about their center axes, said rolls having a core with protruding cleaning pins of rubber or like material mounted thereon.

DESCRIPTION OF THE PRIOR ART

In prior art machines of the above-mentioned type, the cleaning pins tend to damage the sides of the root-crops during cleaning, which frequently is due to the fact that the pins are too hard in order to make cleaning more efficient. To reduce this tendency to damage the root-crops, it has been tried to make the pins softer and/or to make their ends rounded, and in some cases the pins have been provided with a circumferential scraper edge-like groove. However, these attempts have failed; either the cleaning effect has been reduced drastically, or the pins have broken at their attachment to the core because of the edge pressure.

Another problem in connection with the harvesting of root-crops is the character of the soil. If the soil is heavy, wet or stiff, the machine must be driven more slowly; otherwise the cleaning unit will be choked up by soil and stones. If instead the speed of the cleaning rolls is increased to improve the cleaning effect, the result will frequently be the direct opposite; the root-crops are more readily damaged and cleaning in the cleaning unit is not finished so that soil and stones will be taken along to the elevator and the unloading conveyor where a certain further cleaning can take place, and on to the refinery. If, on the other hand, the soil is light, the machine can be driven faster and/or the speed of the cleaning rolls can be increased, but then there is a risk that the root-crops in a greater or less degree will bounce on the cleaning pins and may be damaged.

SUMMARY

It is the object of this invention to provide a harvesting machine of the type mentioned by way of introduction, in which the above mentioned problems have been reduced in a competent manner.

According to the invention, this object is achieved in that the cleaning pins have such an inherent flexural strength that no lateral damage to the root-crops occurs, and are so mounted on their associated core that they are equally flexible in all directions, the cleaning unit according to the invention also being provided with an endless driven holding-down mat travelling over guide pulleys at the front and rear ends of the cleaning unit, the lower part of which mat faces and travels at a distance above the cleaning rolls and exerts a load on the root-crops towards the cleaning pins, the speed of said holding-down mat being variable independently of the rotation of the cleaning rolls, for adjustment of the transit time of the root-crops in the cleaning unit in accordance with the amount of soil and stones carried along. By thus cooperating with the holding-down mat, the cleaning pins are capable of cleaning the root-crops in a gentle manner causing no damage.

BRIEF DESCRIPTION OF THE DRAWINGS

The invention will be described in more detail below, reference being had to the accompanying drawings in which.

DESCRIPTION OF THE PREFERRED EMBODIMENT

Figure 1:
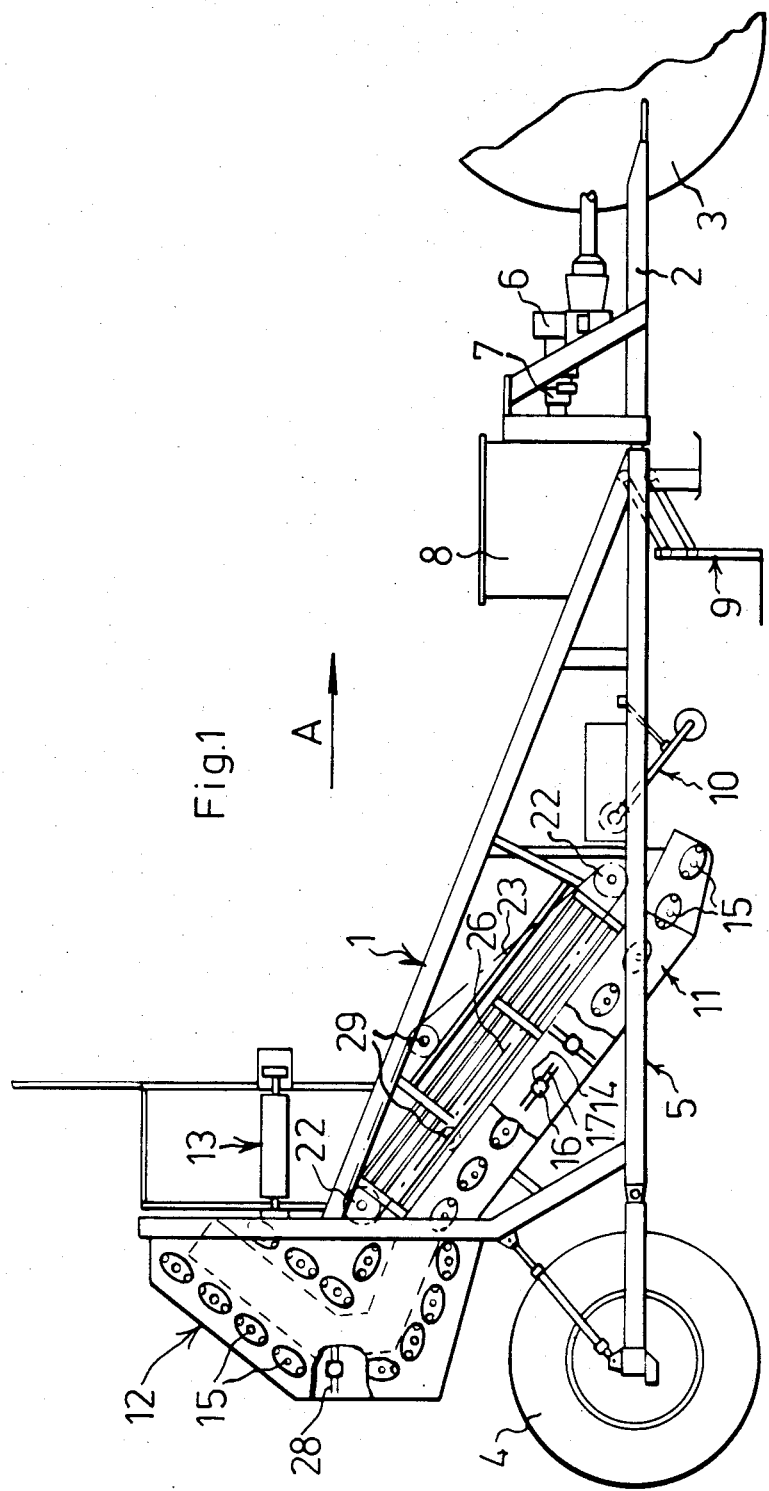
FIG. 1 is a lateral schematic view of a machine for harvesting root-crops growing in rows in the soil, parts of the machine having been removed.
Figure 2:
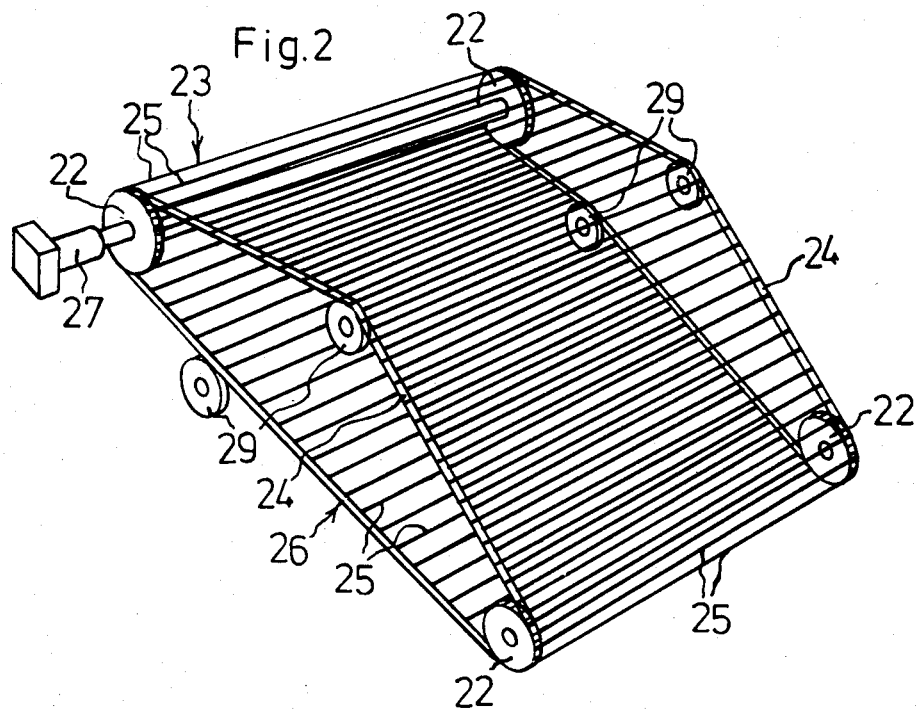
FIG. 2 is a perspective view obliquely from above of a holding-down device comprised by the machine according to FIG. 1.

The machine 1 which is but partly shown in FIG. 1 is intended for harvesting root-crops, especially sugar-beets, growing in rows in the soil, and therefore has been designated beet harvester in the following description. The beet harvester 1 is intended to be coupled to and drawn by a tractor via a drawbar 2, only a part of the tractor rear wheel being shown in the drawing. The beet harvester 1 travels over the ground on rear wheels 4, only one of which is shown in FIG. 1. The drawbar 2 and the rear wheels 4 are connected to a frame 5 which, as seen from the front end to the rear end of the beet harvester in its direction of travel A, has a gear box 6 connected to the power take-off of the tractor via a drive shaft, several hydraulic pumps 7 driven via said gear box, and a hydraulic oil tank 8 for said hydraulic pumps. Underneath the tank 8, a device 9 is suspended from the frame 5 by means of a system of parallel links, said device having a knife for topping the beets prior to harvesting. Before the topping operation, the leaf has been stripped from the beets by means of a front-mounted stripping unit (not shown) on the tractor. The topping device 9 is followed by a unit (not shown) for loosening and lifting the beets which, via a carrier 10, are conveyed up to a cleaning unit generally designated 11 and cleaning the beets from adhering soil and stones. Mounted behind the cleaning unit 11 is an elevator 12 for conveying the beets from the cleaning unit 11 to a transverse conveyor 13 positioned at a higher level than the cleaning unit and unloading the beets into a carriage or the like (not shown) travelling beside the beet harvester 1.

Figure 3:
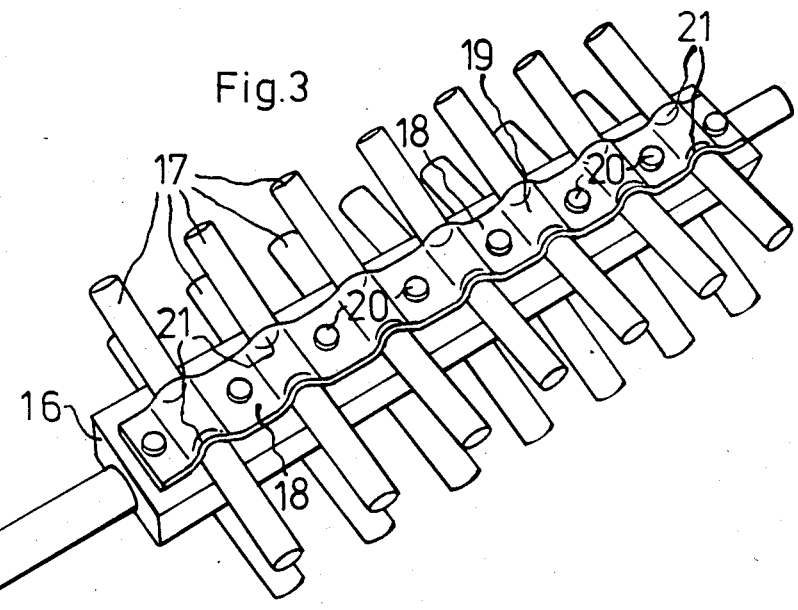
FIG. 3 also is a perspective view schematically illustrating a cleaning roll comprised by the machine.

The cleaning unit 11 comprises several (ten in the case illustrated) mutually parallel cleaning rolls 14 mounted transversely of the travelling direction A of the machine (see also FIG. 3) and rotatably mounted in bearings 15 at the sides of the cleaning unit 11. One of the cleaning rolls 14 is driven by one of the hydraulic pumps 7, the remaining cleaning rolls being driven by the driven cleaning roll via chain transmissions (not shown). As is best seen from FIG. 3, each cleaning roll 14 has a quadrangular core 16 on which cleaning pins 17 of rubber or like material are mounted and project on both sides. The cleaning pins 17 are of circular cylindrical shape with straight ends and are made of a rubber material having such inherent flexural strength that they will not damage the sides of the sugar-beets which are being cleaned in the cleaning unit 11. The cleaning pins 17 are mounted on the core 16 by means of attachments 18 having clasps 19 corresponding to the shape of the cleaning pins and covering the center section thereof and fixing it against the core 16. The attachments 18 are metal straps, and the clasps 19 are formed by arcuate bends, said attachments 18 preferably being detachably mounted on the core 16 by means of screw connections 20 or the like. The cleaning pins 17 are so mounted on the associated core that they are equally flexible in all directions, and to this end the clasps 19 are flanged as at 21.

The cleaning unit 11 also comprises an endless holding-down mat 23 travelling over guide pulleys 22 at the front and rear ends of the cleaning unit 11 and over supporting wheels 29 between these ends. The holding-down mat has two endless side strands 24 formed of rubber belts and travelling over the guide pulleys 22. Extending between the side strands 24 in a lattice-like manner are mutually parallel bars 25, so-called spools, said bars 25 in the lower part 26 of the holding-down mat 23 facing and travelling at a distance over the cleaning rolls 14 and exerting a load on the sugar-beets towards the cleaning pins 17.

The holding-down mat 23 is operable in that at least one, and preferably two, of said guide pulleys 22 are connected to an infinitely variable drive 27 for varying the speed of the holding-down mat 23 independently of the rotation of the cleaning pins 14, whereby the transit time of the sugar-beets in the cleaning unit 11 can be adjusted according to the amount of earth and stones carried along. In the embodiment illustrated, the drive is a hydraulic drive connected to one of the hydraulic pumps 7 and having either a variable throttling or a variable displacement.

In the embodiment illustrated, the lower part 26 of the holding-down mat 23 travels substantially parallel to a plane through the center axes of the cleaning rolls 14, but its angle relative to the said plane and its distance to the cleaning rolls 14 can be readily adjusted by simple mechanical or other means. In this manner, a further or complementary adjustment of the transit time and an adaptation to sugar-beets or other root-crops of different sizes can be effected.

By the above-mentioned cooperation between the cleaning pins 17 on the cleaning rolls 14 and the bars 25 of the holding-down mat 23, the sugar-beets can be cleaned in a gentle manner causing no damage.

The elevator 12 mounted after the cleaning unit 11 is provided with several (fifteen in the drawing) rotatably driven rolls 28, the center axes of which are parallel to the center axes of the cleaning rolls 14 and are of basically the same construction as the cleaning rolls. The rolls 28 are arranged in two mutually spaced apart rolls and, like the cleaning rolls 14, have a core 16 on which pins 17 projecting on either side are mounted. The rolls 28 are arranged in two crescent-like rows, their purpose being not only to transfer the sugar-beets in a gentle manner from the cleaning unit 11 to the unloading conveyor 13, but also to separate from the cleaning unit 11 any soil and stones carried along by the beets during transfer, the separation being effected under the action of gravity.

Naturally, the invention is not restricted to the embodiment described above and illustrated in the drawings, but may be modified in several ways within the scope of the appended claims.

What we claim and desire to secure by Letters Patent is:

1. An arrangement in a machine for harvesting root-crops grown in rows, said machine comprising means for loosening and lifting the root-crops, a cleaning unit for cleaning the crops of soil and stones, said cleaning unit comprising:

a plurality of mutually parallel cleaning rolls mounted on cores transversely of the direction of travel of the machine and driven about their respective central axes, each of said rolls including a plurality of resilient rods affixed generally orthogonally to said core, said rods being grouped in spaced apart pairs on opposite sides of said cores and including a plurality of said pairs along the length of said cores, wherein said core includes a quadrangular shaped member having at least two planar surfaces and wherein said rods are affixed in pairs on opposing surfaces of said quadrangular member, said cleaning rolls including clasp means affixed to said core and formed with spaced apart arcuate bends to receive said rods with said bends being flanged at their peripheral edge to allow omnidirectional movement of said rods, a continuous hold-down mat situated above said rolls, and having a lower portion located adjacent but spaced apart from said rolls, first means for driving said rolls and second means for driving said mat at a speed independent of said first means and wherein said hold-down mat can be adjustably spaced from said rolls.

2. An arrangement according to claim 1 wherein the distance between the lower portion of the hold-down mat and the rolls is adjustably separable.

* * * * *